Jan. 1, 1957  E. J. FARRELL BARNES  2,775,844
MOUSE OR RAT TRAP
Filed June 28, 1954

United States Patent Office 2,775,844
Patented Jan. 1, 1957

2,775,844
MOUSE OR RAT TRAP
E. J. Farrell Barnes, Tulsa, Okla.

Application June 28, 1954, Serial No. 439,583

1 Claim. (Cl. 43—69)

This invention is directed to improvements in mouse or rat traps and has for its primary object to provide an extremely efficient, reusable and automatically self-setting trap, which can be used to trap and collect a plurality of rodents without being rebaited.

Another object of this invention is to provide a liquid holding receptacle, into which the rodents fall and are drowned, and a hinged lid for the receptacle, which carries the bait and which swings, under the weight of a rodent, to a vertical position to dump the rodent into the liquid, the lid being constructed to carry the bait in a manner so that the rodent cannot touch it and so that it cannot fall off when the lid swings to a vertical position and the lid being weighted to automatically return to a horizontal position after the rodent falls off the vertically disposed lid into the receptacle.

A further object of this invention is to provide a ramp, which is supported by the receptacle and attached thereto in a manner to be folded thereagainst and to be extended therefrom, the ramp terminating, at its upper end, in a platform that is spaced from the lid so that the rodent has to jump from the platform onto the lid which immediately swings under the weight of the rodent to a vertical dumping position.

A still further object of this invention is to provide a simple, compact and inexpensive trap which effectively traps a rodent and then automatically resets itself.

These and ancillary objects are attained by this invention, the preferred form of which is described herein and illustrated in the accompanying drawing, wherein.

Figure 2:
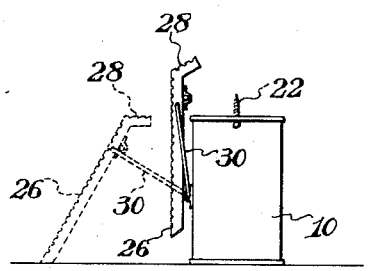
Figure 2 is a side elevational view of the trap, showing the ramp in full lines folded against the receptacle and in dotted lines extended therefrom ready for use.
Figure 1:
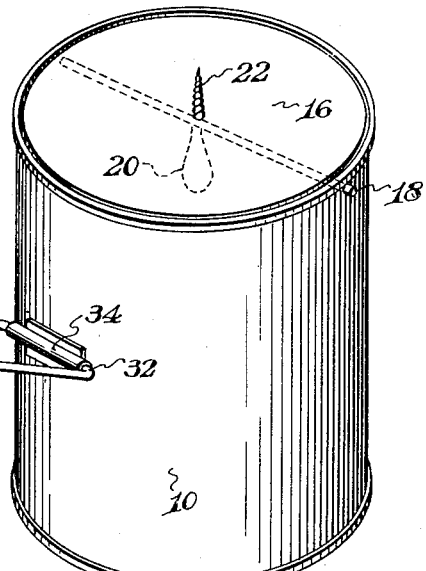
Figure 1 is a perspective view of the trap, shown in set position.
Figure 4:
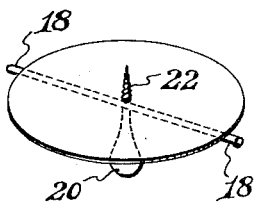

Referring now more particularly to the drawing, the trap includes a receptacle 10, which is shown as cylindrical but can be in other shapes. The receptacle has a smooth inner wall and contains a quantity of liquid 12, which may be water. The top 14 of the receptacle is open and is closed off by a smooth surfaced flat lid 16 which is pivoted for vertical swinging movement. A pivot rod 18 extends diametrically across the underside of the lid and has its ends journalled in suitable openings formed in the side wall of the receptacle adjacent the open top. A pendelous weight 20 depends from the center of the underside of the lid and holds the lid in a horizontal closed position, as shown in Figure 1. A spike 22 upstands from the center of the upper side of the lid and the bait 24 is impaled on the spike.

Figure 3:
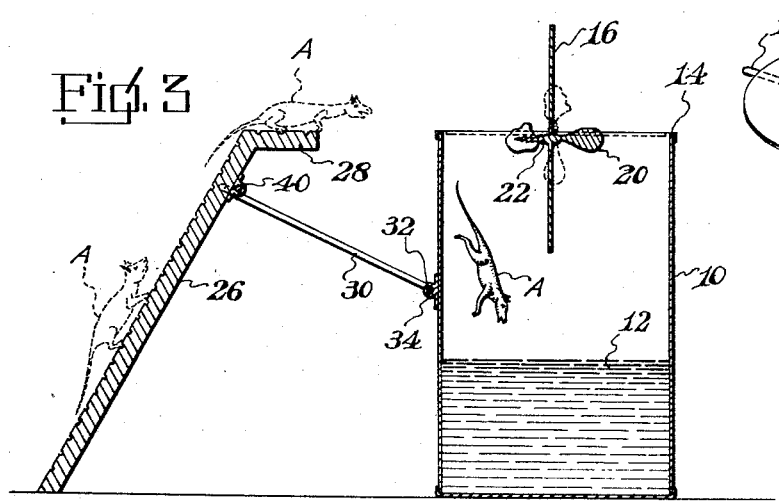
Figure 3 is a vertical sectional view of the receptacle, the ramp being shown in elevation, and the trap being shown in its trapping position, and, Figure 4 is a perspective view of the lid.

An inclined ramp 26 is carried by the receptacle and terminates at its upper end in a horizontal platform 28 which in the set position of the trap is coplanar with the lid and spaced radially therefrom, as shown in Figure 3. The ramp pivotally carries a brace 30 which is hingedly attached to the receptacle so that the ramp can be arranged in the extended set position of Figure 3 and in the folded position of Figure 1. The brace is U-shaped and has its portion 32 rotatably sleeved in the sleeve 34 which is suitably attached to the outside of the receptacle and arranged transversely thereof. The free, inturned ends 36 of the legs of the brace are journaled in suitable openings formed in the side edges of the ramp, below the platform and a brace rod 38 is attached at its ends to the legs at the ends and is rotatably sleeved in a bearing sleeve 40 attached transversely to the underside of the ramp. The outer sides of the ramp and platform are suitable roughened, as by the transverse grooves 42, to provide a traction surface for the rodent. The platform faces the lid at right angles to the pivot rod 18.

In use, the bait 24 is impaled on the spike 22 and the lid 16 is held in a horizontal, top closing position by the weight 20. The receptacle, of course, has been previously filled with water or other liquid to a depth sufficient so that the rodents cannot stand on the bottom and prevent themselves from drowning. The ramp 26 is swung away from its vertical position alongside the receptacle to an inclined position which disposes the platform in a horizontal position, spaced from the receptacle and the lid. The rodent A of Figure 3 climbs up the ramp 26 and stands on the platform 28, preparatory to launching himself onto the lid 16 to acquire the bait 24. It is to be noted that the axis of the pivoted lid 16 is transverse to the axis of the platform so that when the rodent lands on the lid it lands on the side of the lid which is capable of giving way. When the rodent lands on the lid, it immediately collapses by pivoting to a vertical position under the weight of the rodent. The rodent is instantaneously dumped into the receptacle by sliding off the vertically disposed lid, which has a smooth wall and the rodent cannot hold on to it.

Immediately after the rodent slides off the lid into the liquid, where it is drowned, the lid 16 swings back to its horizontal position by virtue of the weight 20 and, thus, the trap automatically resets itself for future use. After a number of rodents have been trapped and drowned, the receptacle is emptied of the liquid and dead rodents and refilled with clean liquid for future use.

The spacing of the platform from the lid requires the rodent to jump onto the lid and prevents it from crawling around the top and possibly excaping with the bait. The moment the rodent lands on the lid he is dumped.

It is to be noted that the ramp is hingedly attached to the receptacle so that it can be folded to a vertical position thereagainst, making the trap more compact for storage and shipping.

While the preferred form of my invention has been shown and described herein, such is merely exemplary in purpose and limitation is sought only in accordance with the appended claim.

What is claimed is:

In a rodent trap, which includes an open top receptacle adapted to contain liquid and having a weighted lid pivotally closing off the top; the improvement which comprises a bearing bracket mounted on the side wall of the receptacle and disposed transversely thereof intermediate the top and bottom, a substantially U-shaped pivot rod having a straight bight portion rotatably mounted in the bracket and having parallel legs, a ramp disposed vertically alongside the receptacle, means pivotally attaching the free ends of the legs to the ramp adjacent the upper end thereof, said ramp having a beveled bottom edge and an upper edge, a platform laterally offset at an obtuse angle from the upper edge and forming a continuation thereof and extending inwardly toward the receptacle, said ramp, when its bottom edge is seated flat on a support on which the receptacle is seated, being angularly disposed relative to the top of the receptacle and positioning the platform substantially in a horizontal plane at the same height as the top of the receptacle and spacing the free end of the platform from the top of the receptacle and said ramp being movable about the bracket and the pivotal attachment of the rod legs into a position alongside of and parallel with the receptacle.

References Cited in the file of this patent

UNITED STATES PATENTS

| | | |
|---|---|---|
| 121,608 | Francisco | Dec. 5, 1871 |
| 887,843 | Pierce | May 19, 1908 |
| 1,419,299 | Orbe | June 13, 1922 |
| 1,727,666 | Nicks et al. | Sept. 10, 1929 |

FOREIGN PATENTS

| | | |
|---|---|---|
| 1,882 | Great Britain | 1885 |